Patented Nov. 18, 1930

1,781,966

UNITED STATES PATENT OFFICE

FRITZ BALLAUF, FRIEDRICH MUTH, AND ALBERT SCHMELZER, OF ELBERFELD, GERMANY, ASSIGNORS TO GENERAL ANILINE WORKS, INC., OF NEW YORK, N. Y., A CORPORATION OF DELAWARE

CARBAZOLE-INDOPHENOL COMPOUNDS AND PROCESS OF PREPARING THE SAME

No Drawing. Original application filed January 16, 1925, Serial No. 2,926, and in Germany, January 24, 1924. Divided and this application filed November 6, 1926, Serial No. 146,842.

We have invented new and useful improvements in the manufacture of dyestuff intermediates of which the following is a specification. This is a division of Ser. No. 2,926, filed on January 16, 1925, which has matured into Patent No. 1,675,478 dated July 3, 1928.

Our present invention consists in the production of the new carbazoloic-acid-arylid-indophenols which we have found to be valuable intermediates for the production of sulphide vat dyestuffs. Whereas the carbazoloic acids themselves, i. e.

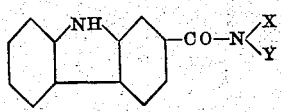

Carbazole-1-carboxylic acid

Carbazole-2-carboxylic acid

Carbazole-3-carboxylic acid do not condense readily with nitroso-phenols to the corresponding indophenols, we have found that by reacting with primary and secondary aliphatic amines in presence of condensing agents upon carbazoloic acids, carbazoloic-acid-alkylamides of the following type are obtained:—

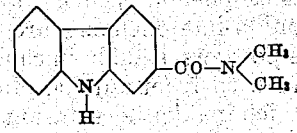

(in which formula X stands for hydrogen or an alkyl radical and Y for an alkyl radical) and these condense easily with nitrosophenols. The different carbazole-carboxylic acids can be used, though the carbazole —1— and the carbazole-2-carboxylic acids being the most easily technically accessible are particularly valuable for our process. The carbazole-1-carboxylic acid can be produced according to Ciamician (Gaz. 12, page 272) and the carbazole-2-carboxylic acid is described by Borsche (Ber. 40, page 381). Aliphatic as well as aromatic primary and secondary amines can be condensed with the acids. In the example given herein, we describe the condensation of carbazole-carboxylic acids with dimethylamine, but our invention is not limited to the use of this amino body.

Example.—42 parts by weight of carbazole-2-carboxylic acid are dissolved to 1000 parts of toluene and at the boiling temperature of toluene, dimethylamine is bubbled through this solution with a simultaneous and gradual addition of phosphorus trichloride, until no more free carbazoloic acid can be detected in the solution. The solvent is now distilled off, the residue digested with water and the water insoluble carbazoloic-acid-arylid filtered off. The 2-carbazoloic-acid-dimethyl amide is obtained by re-crystallization from nitrobenzene in thick needles melting with slight decomposition at 198° C.; by prolonged heating, the melt becomes clear and transparent. The 2-carbazolic acid-dimethyl-amide is insoluble in most organic solvents as well as in water, caustic alkali solutions and dilute acids, but easily soluble in more concentrated sulfuric acids (from 60–66° C.) and in hot nitrobenzene; in cold nitrobenzene it is only sparingly soluble.

It has the formula:

The amide as obtained in the above is dried and dissolved in 2750 parts by weight of concentrated sulfuric acid 66° C. 27.5 parts by weight of nitrosophenol are dissolved in 460 parts of concentrated sulfuric acid of about 64° Bé. both solutions are cooled and mixed. After a short while, the reaction mass is poured on ice, the reddish-blue colored indophenol is filtered off;

It has the formula:

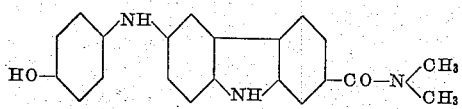

The indophenol dissolves in alcohol with a reddish-blue color and in concentrated sulfuric acid with a greenish-blue color. In alkaline solution, the indophenol is readily reduced by sodium-sulfide or hydrosulfide (NaSH) to the corresponding leuco-indophenol. The latter can also be obtained directly by pouring the reaction mass in sulfuric acid upon a solution of caustic soda diluted with a large amount of ice, reducing this solution and precipitating the leuco-indophenol by acidification.

We claim:—

1. In the process of preparing carbazoloic acid - alkyl - amido - indophenols the steps which comprise reacting with an aliphatic amine having a replaceable hydrogen atom linked to the nitrogen, in presence of an anhydrous halide condensation agent, upon a carbazole-carboxylic acid and condensing the so obtained carbazoloic-acid-alkylamide with a nitrosophenol.

2. In the process of preparing carbazoloic-acid - alkylamido - indophenols the steps which comprise reacting with an aliphatic amine having a replaceable hydrogen atom linked to the nitrogen, in presence of phosphorus trichloride, upon a carbazole-carboxylic acid and condensing the so obtained carbazoloic-acid-alkylamide with a nitrosophenol in presence of sulfuric acid.

3. The process of preparing 2-carbazoloic-acid-dimethyl-amido-indophenol which comprises reacting with dimethylamine in presence of phosphorus-trichloride upon carbazole-2-carbazoloic-acid and condensing the so obtained 2-carbazoloic-acid-dimethyl-amide with para-nitrosophenol in presence of sulfuric acid.

4. As new products the carbazoloic-acid-alkylamido-indophenols, obtainable by reacting with an aliphatic amine, having a replaceable hydrogen atom linked to the nitrogen, upon a carbazole-carboxylic acid and condensing the carbazoloic-acid-alkylamide with a nitrosophenol, which carbazoloic-acid-alkylamido-indophenols are reddish blue to blue powders, soluble in concentrated sulfuric acid with from reddish-blue to blue color and which in alkaline solution are readily reduced with sodium sulfide or hydrosulfide to the corresponding leuco-compounds.

5. As a new product the 2-carbazoloic-acid-dimethylamido-indophenol of the following formula:

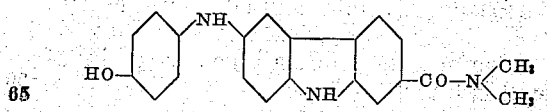

which is a reddish-blue powder soluble in concentrated sulfuric acid with a reddish-blue color being readily reduced to the corresponding leuco-compound when treated in alkaline solution with sodium sulfide or hydrosulfide.

In testimony whereof we have hereunto set our hands.

FRITZ BALLAUF.
FRIEDRICH MUTH.
ALBERT SCHMELZER.